United States Patent [19]

Kostansek

[11] 4,427,450

[45] Jan. 24, 1984

[54] CHALKING-RESISTANT, CALCINED KAOLIN CLAY PIGMENT AND METHOD OF MAKING

[75] Inventor: Edward C. Kostansek, Annandale, N.J.

[73] Assignee: Engelhard Corporation, Edison, N.J.

[21] Appl. No.: 326,630

[22] Filed: Dec. 2, 1981

Related U.S. Application Data

[63] Continuation of Ser. No. 175,567, Aug. 4, 1980, abandoned.

[51] Int. Cl.$^3$ ............................................... C09C 1/42
[52] U.S. Cl. ............................................... 106/288 B
[58] Field of Search ................... 106/288 B; 260/29.6; 501/141, 145

[56] References Cited

U.S. PATENT DOCUMENTS

| | | | |
|---|---|---|---|
| 2,928,751 | 3/1960 | Lyons | 501/145 |
| 3,014,836 | 12/1961 | Proctor | 106/288 B |
| 3,226,252 | 12/1965 | Hemstock | 106/288 B |
| 3,383,438 | 5/1968 | Allegrini et al. | 106/288 B |
| 3,403,041 | 9/1968 | Lyons et al. | 106/288 B |
| 3,754,712 | 8/1973 | Cecil | 106/288 B |
| 4,118,246 | 10/1978 | Horzera et al. | 106/288 B |
| 4,241,142 | 12/1980 | Kaliski et al. | 106/288 B |

*Primary Examiner*—Edward J. Meros
*Attorney, Agent, or Firm*—Inez L. Moselle

[57] ABSTRACT

Novel pigments useful as primary extenders in exterior grade latex formulations are described. The pigments are composed of particles of calcined clay, substantially all the particles of which are finer than about 44 microns and having an average particle size, equivalent spherical diameter, within the range of about 3 to 10 microns, most preferably within the range of about 4 to 8 microns. The novel pigments are further characterized by having a significantly lower oil absorption value (ASTM) than conventional, calcined clay pigments. Exterior grade paint formulations containing such pigments can be formulated below the critical pigment volume concentration without substantially reducing opacity or chalking resistance.

6 Claims, No Drawings

CHALKING-RESISTANT, CALCINED KAOLIN CLAY PIGMENT AND METHOD OF MAKING

This application is a continuation, of application Ser. No. 175,567, filed Aug.4, 1980, now abandoned.

BACKGROUND OF THE INVENION

This invention relates to novel chalking-resistant pigments, to their manufacture and to their use as opacifying extenders in exterior grade paint formulations. More specifically the invention relates to novel calcined clay pigments, the pigments being characterized by possessing a unique combination of coarse particle size and low oil absorption value.

The paint industry supplies consumer-oriented products of the solvent and emulsion types. Solvent paints are relatively simple systems, easy to formulate but difficult for the consumer to use. Solvent paints contain a binder (oil or resin), a solvent (thinner), drying agents and pigments. Emulsion or so-called "latex" paints are complex mixtures containing latex surfactants, protective colloids, biocides, freeze-thaw stabilizers, emulsifiers and water in addition to the one or more types of pigment which may be used. Following their introduction after World War II, latex paints have gained substantially in market acceptance. They now account for a majority of interior and exterior paint trade sales.

Interior and exterior latex paints have generally similar formulations. An important distinction however is that exterior grade paints contain relatively more binder and prime pigment but less extender pigment than interior paints. This is because paint film integrity and overall durability are more critical in exterior paints than in interior grades.

An important parameter in paint formulation is the pigment volume concentration, or PVC. PVC is a control factor in the design of paint formulations, because paint properties are governed by volume rather than weight effects. The following equation defines the PVC as a percentage of volume of dried paint film:

$$PVC = \frac{\text{volume of pigments}}{(\text{volume of pigments} + \text{volume of binder})}$$

The critical pigment volume concentration, or CPVC, is defined as that PVC at which air interfaces are generated in the dry paint film due to deficiency of binder with respect to pigment. It is well known that many paint volume properties change drastically at CPVC. The relationship between PVC and CPVC is nonlinear. There is authority for the view that different paints are properly compared on the basis of equal reduced pigment volume concentration, or RPVC. The RPVC is defined by the following:

$$RPVC = PVC/CPVC$$

Generally exterior grade paints have an RPVC less than 1 and interior paints have an RPVC greater than 1. There is considerable controvery over whether in latex paint the CPVC is a characteristic of the pigment or a characteristic of both pigment and binder. There is published authority for both points of view.

CPVC is related inversely to the amount of binder that the pigment particles "absorb". A conventionally used technique for determining this property of a pigment or extender is the amount of linseed oil needed to form a paste containing a given weight of pigment. This is referred to in the art as oil absorption. As used herein the term "oil absorption" refers to the procedure described in ASTM D-281. Substitution of an equal amount of high oil absorption extender pigment for one of low oil absorption results in a reduction of the CPVC of that paint. This in turn restricts the range of PVC that can be utilized in exterior formulations and the amount of extender pigments which can be employed.

Exterior grade latex paints contain a mixture of prime and extender pigments with titanium dioxide most generally used as the prime pigment because of its outstanding optical properties. Zinc oxide is employed to a smaller extent. The most commonly used extender pigments for exterior grade latex paints are calcium carbonate and talc. Kaolin clays are rarely used in exterior grade paint formulations, and when they are employed only small amounts are used for reasons which will be discussed below. The binder in emulsion paints consists of globules (0.1 to 1.0 micron diameter) of film-forming polymer of 10,000 to 1,000,000 molecular weight. The latex particle size and composition are varied to effect changes in such properties as durability, gloss, glass transition temperature and the like. At present acrylic and vinyl-acrylic resins account for the majority of binders used in latex paints.

The weatherability of exterior grade coatings is determined by the ability of the coatings to resist chalking, fading and brittlement, gloss reduction, frosting and bleeding. Chalking, which is manifested by the formation of a powder on a painted surface, is one of the most undesirable performance characteristics of a paint. It involves the chemical degradation of the paint binder by atmospheric and meteorological attack, from which loose, removable powder (the pigment) is evolved from the paint film at or just beneath the surface. Two distinct mechanisms are believed to be responsible for chalking. One involves direct ultraviolet degradation of the binder. It is related to the ultraviolet stabilizer of the binder. With present-day use of ultraviolet screens in paints this is no longer much of a problem. The second mechanism occurs when a pigment acts as a catalyst for chemical oxidation of the binder. Thus it is evident that chalking is a characteristic of a paint film and the terms "chalking pigments" and "chalking-resistant pigments" as used herein will refer to chalking of the paint film containing pigment. Chalking is a problem still considered substantially unsolved by those in the paint industry, and methods for reducing chalking are continually sought by the paint industry and its suppliers.

Extender pigments profoundly influence the properties of latex paints. They control texture, optical and flow properties. Extenders involve a large group of materials with diverse chemical properties. In most published studies of extenders, the pigments have been evaluated in terms of PVC rather than RPVC. This makes quantitative comparisons of extenders difficult. Kaolin extender pigments are widely used in interior formulations, whereas the undesirable weathering properties of kaolin clay pigments have severely limited their use in exterior grade paint formulations. Several hypotheses have been suggested to describe chalking by $TiO_2$, but little or no work has been done with extender pigments.

Commercially available, pigment-grade hydrous kaolins have oil absorption generally in the range 25–40 grams oil per 100 grams clay. Hydrous kaolins having the lower values in this range are desirable in exterior grade latex formulations but their chalking properties preclude such use. The high oil absorption values resulting from conventional calcination of kaolin clay pigments, which is typically in the range of 45–60 grams oil per 100 grams clay, preclude their use as prime extenders in latex paints formulated below CPVC.

An extensive study of simple extender pigment in vinyl polymer at 50% PVC is described by F. Liberti, Official Digest, vol. 33, March 1961, page 390. Liberti found that four particle sizes of talc, coarse (ASP ®400) and fine (ASP 100) hydrous kaolin, calcined kaolin (nonspecified particle sizes) and fine calcium carbonate all chalked at essentially the same rate, that is, these pigments all rated "fair" on a scale of good-fair-poor. Liberti also found that coarse calcium carbonate, rated as "good," chalked less than the fine calcium carbonate, but the RPVC was not controlled.

Kaolin clay pigments are supplied as pigments and extenders in uncalcined (hydrous) grades and calcined grades, the latter being favored where opacification (hiding power) is an important criterion. The hydrous grades include products composed predominantly of relatively fine and relatively coarse particles and are frequently supplied as blends of fractions of different particle sizes. Hydrous grades that contain an appreciable content of particles larger than 2 microns as determined by sedimentation include a significant quantity of naturally occurring stacks or booklets as well as the individual platelets known to characterize particles of kaolin that are finer than about 2 microns. The finer grades are composed predominantly of such individual platelets. Delaminated hydrous kaolins are produced by mechanically altering the naturally occurring stacks or booklets in whole (unfractionated) crude clays or coarse particle size fractions thereof. The delaminated grades generally have higher oil absorption values than naturally occurring clay of similar particle size distribution as determined by sedimentation. Most commercially available grades of calcined kaolin pigments have average particle sizes in the range of about 1.0 to 3 microns, and oil absorption values above 40 g./100 g. Generally oil absorption increases inversely with average particle size. Ultrafine grades of calcined clay having an average particle size below 1 micron are used as extenders and coating pigments by the paper industry. Oil absorption values exceed 80 g. oil/100 g. clay. Coarse particle size calcined clay pigments have been supplied by the industry as products having average particle sizes in the range of 4 to 7 microns, with oil absorption values above 45 g./100 g. A process for preparing such poducts involving stage-wise fractionation of a dispersed pulp of crude clay to selectively reject undersized and oversized particles is described in U.S. Pat. No. 2,928,751 to Lyons. The calcined coarse kaolin pigment, as disclosed in this patent, is contemplated for use as an ingredient in the manufacture of ceramics.

U.S. Pat. No. 3,519,453 to Morris et al discloses blending calcined, delaminated clay with hydrous coating clays for coating applications in paper. Calcination is shown to increase oil absorption and coarsen particle size, mostly by agglomeration of fine material. U.S. Pat. No. 3,403,041 discloses the use of a chemically modified calcined mechanically delaminated clay in a paint formulated for interior use. U.S. Pat. No. 3,171,718 discloses (column 11) alkyd paint formulations containing calcined delaminated clay at 50% and 60% PVC. These paints are also formulated for interior use.

While hydrous and calcined clays have enjoyed wide-spread use as extenders for interior paints, to the best of my knowledge known forms of kaolin pigments or extenders, both hydrous and calcined grades, have not been used extensively by the paint industry as the principal extender in the formulation of exterior grade paints. Furthermore, to the best of my knowledge known forms of kaolin clay do not possess the combination of properties required for such use. These properties include adequate resistance to chalking, ability to be formulated at the high PVC necessary in exterior grade latex paint formulation and acceptable opacification properties.

It is known in the art that wet or dry milling of pulverized calcined clay pigments serve to breakup agglomerates in the calcined clay. This reduces oil absorption but has been associated with a significant loss of opacifying ability when the calcined clay pigments were evaluated in their intended end uses, namely in paper and in interior grade paints. Thus, post-milling has been a step avoided by suppliers of calcined clay pigments designed for prior uses of such clays.

THE INVENTION

The present invention results from a series of findings relative to those properties of clay pigments that have heretofore placed a constraint upon their utility in exterior grade paint formulation. I have discovered that contrary to the prior art knowledge of the adverse effect of milling on the opacifying properties of calcined clay pigments for most uses, milling of calcined clay particles, in particular coarse particles of calcined clay, to an extent sufficient to reduce substantially the oil absorption thereof, can be practiced to permit adequate loading of the calcined clay without substantial impairment of the opacifying properties of the clay when the calcined and then milled clay is formulated below CPVC in exterior grade paint formulations. I have also discovered that such calcined and milled clay can be used as an extender pigment, preferably the principal extender in exterior grade paint formulations, to produce paint films having chalk resistance comparable to heretofore used talc and calcium carbonate extenders and superior hiding powder.

In its broadest aspect novel calcined clay pigments of the present invention have an average particle size of 3 microns or above, preferably in the range 3 to 10 microns, and an oil absorption value more characteristic of hydrous kaolin, for example about 30 g. oil/100 g. clay or below, than typical calcined kaolin. The pigment may be produced by calcined a coarse particle size fraction of hydrous kaolin clay crude and subjecting the calcined material to controlled milling.

In a presently preferred embodiment of the invention calcined kaolin clay extender pigments of further reduced oil absorption value are produced by blending a minor amount of a fine fraction of hydrous kaolin clay of average particle size below about 1 micron with a coarse fraction of hydrous kaolin clay of average particle size 3 to 10 microns, the major component of the blend being the coarse fraction, calcining the blend and milling the calcined blend, whereby mechanical problems associated with milling fine calcined clay are minimized. The particle sizes of coarse and fine fraction of kaolin particles and the proportions thereof are such that the blended, calcined and milled product has an average particle size of about 3 microns or above, preferably in the range 3 to 10 microns. It will be recognized that the scope of the invention also includes calcining, coarse and fine fractions separately, then blending and milling, or calcining and milling separately then blending.

In practice of the invention milling is terminated before the particles of calcined clay are so reduced in particle size as to create a fine particle size calcined clay having an average particle size appreciably below 3 microns; for example 2–2½ microns average particle size. Such pigments will lack chalk resistance achievable when milled coarser calcined clay particles are utilized.

Pigments of the invention may be used to extend a titania or other primary pigment in latex or solvent paint formulations. The pigments of the present invention are capable of being incorporated in exterior grade paints at higher loadings than previously attainable.

DESCRIPTION OF THE PREFERRED EMBODIMENTS

Crude kaolin clays useful in the production of pigments of the invention are preferably those that contain a substantial proportion of particles (clay booklets) larger than 2 microns e.s.d. The coarse clay particles are concentrated from such crude clay by blunging the crude in water, degritting the resulting pulp, centrifuging the degritted clay to concentrate one or more coarse size clay fractions as the centrifuge underflow and, if necessary, repeating the centrifugation one or more times to remove fine particles as an overflow and oversize, e.g., plus 20 micron particles. The recovered coarse size fraction of hydrous clay should have an average particle size in the range of about 3 to 10 microns, preferably in the range of about 4 to 8 microns. Particle size of the hydrous clay calciner feed is reflected in the particle size of the calcined and pulverized clay. Since coarse calcined clay has greater chalk resistance than finer calcined clay, it is desirable to produce from the crude a fraction that has maximum average particle size. However, calcined clay particles that are too large, e.g., larger than 10 microns generally lack the tinting power of finer particles. Clay fractions having an average particle size in the range of about 4 to 8 microns, e.s.d., strike a balance between these considerations. Generally, hydrous clay particles larger than about 20 microns should be avoided or at least should be present in minimal amount.

Those knowledgeable about the nature of crude clays and clay fractions will recognize that naturally occurring clays are polydisperse. In other words, they are composed of particles of varying sizes. The same is true of coarse size fractions of clays recovered from clay crude in conventional centrifuges. For example a coarse size fraction of kaolin clay having an average particle size of 4.5 microns may contain 90% by weight of particles finer than 14 microns, 70% by weight of particles finer than 7 microns and 25% by weight finer than 2 microns.

All particle sizes used herein refer to values obtained by conventional wet sedimentation techniques using 2.58 as the value for particle density in the case of hydrous clays and 2.63 as the value for particle density for calcined clays. These values are conventionally expressed as "equivalent spherical diameter" or "e.s.d.". Average particle size, as used herein, refers to that value of particle size at which 50% by weight of the material is finer than and 50% is coarser than the designated value.

The coarse size fraction of the kaolin clay crude should not be mechanically delaminated prior to calcination. Among other effects, delamination will result in undesirable increase in oil absorption and decrease in particle size.

The coarse size fraction of clay recovered as the underflow pulp from the centrifuges may be flocculated by addition of acid and/or prior to bleaching when using any conventional filtration apparatus such as a rotary vacuum filter. Alternatively the pulp can be dewatered without flocculation in an electrically augmented vacuum filter. The filter cake may be washed and then dried in conventional drying equipment such as a rotary dryer. Alternatively the filter cake can be dispersed by addition of a suitable dispersant such as a condensed phosphate salt, sodium salt, an organic dispersant or ammonia, and then spray dried. After drying by any of these techniques the dry clay should be pulverized before the calcination step. Calcination occurs under conditions of time and temperature such that the kaolin particles are substantially dehydrated by passing through the characteristic endotherm—about 550° C. Milling, understood herein to mean reduction of particle size and grinding, of the calcined "metakaolin" product follows calcination. If desired, calcination may also be carried out such that the kaolin passes through the characteristic exotherm at about 980° C. Kaolin pigments so treated are generally brighter but also more abrasive.

It is especially preferred, however, to use acid kaolin as the calciner feed. The salt content in the clay should be kept low, as the presence of significant quantities will cause sintering during calcination and undesirably large increases in oil absorption.

The calcined product has a much higher oil absorption than the hydrous kaolin feed material. Milling reduces the oil absorption and may be continued until oil absorption of the calcined kaolin has been lowered enough to provide an improved pigment, which when formulated below CPVC in exterior paints has low-chalking properties without significantly reduced opacifying power. Generally it is preferred to have the oil absorption below about 35 g. oil/100 g. clay, or in the range 10–30 g. oil/100 g. clay, in which most extender pigments fall. Milling equipment in which compression, densifying or compacting forces predominate is preferred, since the compressive-type forces produced in such a mill appear to assist in obtaining optimum packing and low oil absorption. Ring-roller and muller are examples of preferred types of milling equipment.

Achieving low oil absorption with pigments of the present invention is a function of type of mill, time of milling and choice of particle size in the blend. On commercial scale equipment achievement of very low oil absorption through milling can become prohibitively expensive. In the laboratory values as low as about 20 g. oil/100 g. clay have been achieved with some pigments of the present invention, and thus it appears obtaining oil absorption values below 20 g./g. may be difficult to achieve commercially with pigments of the present invention.

Fine particle size calcined clay may be obtained by fractionating the same or a different crude clay used as a source of the coarse clay. Known centrifugation techniques are used to recover from a dispersed aqueous pulp of degritted hydrous kaolin clay—a fine particle fraction that is at least 70% by weight, and preferably at least 80% by weight, and most preferably at least 90% by weight finer than 2 microns. A typical fine particle size cut is 100% finer than 10 microns, 90% finer than 2 microns, 70% finer than 1 micron, and 50% finer than 0.6 microns. Therefore particle size fractions can be blended as an aqueous pulp with the coarse fraction before filtration and drying or the blending can take place after calcination and before milling or after milling. Blending with fines, when desired, may be carried out by techniques conventional in the art. The hydrous clay, for example, may be blended in slurry form as various cuts exit from fractionating devices. Fine material may be blended with coarse material in ratios up to 50% by weight of fine material. The preferred ratios will depend to a certain degree on the average particle sizes of the coarse and fine cuts. For coarse cuts of average particle size 6-8 microns, the preferred blending ratio is in the range of 20-30% fine fraction by weight, the fine fraction having an average particle size between 0.3 and 0.9 microns, and the remainder coarse fraction. When blending, especially good results are achieved when the amount of material in the coarse cut of particle size smaller than 2 microns is kept below about 100% by weight of the coarse cut.

Pigments of the invention may be used in latex or solvent paints without departing from conventional formulations or formulation techniques. The pigment may be used as an extender in conjunction with titania or other primary pigment. A significant advantage of the pigment of the present invention is that, relative to other common extenders, it may be used to replace more of the very expensive titania primary pigment in common formulations without decreasing chalking resistance or opacity.

Chalking performance of pigments is commonly measured by direct exposure to atmospheric conditions on so-called "test-fences" situated in various locations. These tests take several years to produce results. In order to produce results in a shorter time, accelerated weathering tests have been devised. A panel, coated with the paint formulation containing the pigment to be tested, may be exposed to ultraviolet radiation, high humidity and high temperature in a UVCON® test chamber, available from the Atlas Electric Corporation. Testing procedures and conditions follow ASTM G53-77, in which the instrument is also described. After periods of exposure a chalking rating may be determined qualitatively by visual comparison with standard samples. A rating of 1 is poorest relative to chalking and a rating of 10 is best (lowest chalking), the rating procedure following ASTM D659-74. Weight loss methods may also be used. Occasionally the accelerated tests do not correlate as accurately as might be desired with actual test fence data, and paint manufacturers often use both tests. The accelerated test has the great advantage of requiring only about two months, not two or more years, for results.

In order to more fully illustrate the nature of the invention, the following examples, not to be construed as limiting, are presented:

EXAMPLE 1

A coarse-grade hydrous kaolin clay having a particle size distribution of 100% finer than 44 microns, 90% finer than 14 microns, 70% finer than 7 microns, 50% finer than 4.1 microns, 33% finer than 2 microns, 24% finer than 1 micron and 10% finer than 0.4 microns was used as the parent material for obtaining a coarse-fraction hydrous kaolin clay for further processing. The coarse-grade clay had been produced by blunging a Georgia crude clay, degritting the crude and fractionating the degritted crude by standard techniques in the clay art. This conventionally processed clay, an acid kaolin, was found to have very minor amounts of residual soluble salts, for example less than 0.1% weight.

Two hundred and fifty grams (250 g.) of this clay was calcined in a fixed bed in a muffle furnace at 450° C. for 90 minutes. After this calcination treatment the sample had an oil absorption value of 38 g. oil/100 g. clay by ASTM. The sample had lost 7% of its crystalline water as measured by loss on ignition before and after calcination. The sample was then milled in a mortar and pestle until an oil absorption value of 30 g./100 g. was reached. It was then micropulverized through a 0.020-inch screen to "fluff-up" the pigment which aids in dispersing the pigment in paint formulation processes. The calcined and milled product had a particle size distribution of 100% finer than 30 microns, 90% finer than 14 microns, 69% finer than 7 microns and 50% finer than 4.6 microns, 26% finer than 2 microns and 15% finer than 1 micron.

This and subsequent samples were used as sole pigments in latex paint formulations, described in another example following, for the purpose of rating chalking characteristics of the pigments. The oil absorption values obtained herein by following the ASTM procedure were reproducible to within ±2 units for oil absorption numbers up to about 46 g. oil/100 g. clay.

EXAMPLE 2

Same as Example 1, except calcination was accomplished at 600° C. for 2 hours. Under these conditions the sample lost 92% of its crystalline water as measured by L.O.I. before and after calcination. The oil absorption value after calcination was 41 g. oil/100 g. clay, and after milling it was 30 g./100 g. Particle size distribution of the final product was the same as in Example 1.

EXAMPLE 3

Same as Example 1, except calcination was accomplished at 900° C. for 2 hours. Under these conditions the sample lost 98% of its crystalline water as measured by L.O.I. before and after calcination. The oil absorption value after calcination was 46 g. oil/100 g. clay, and after milling it was 30 g./100 g. Particle size distribution of the final product was the same as in Example 1.

EXAMPLE 4

A sample of the coarse-grade hydrous kaolin of Example 1 was acid flocced and washed with water to remove virtually all traces of soluble salts, and air dried prior to calcination in a muffle furnace. Two-hundred and fifty grams (250 g.) was calcined in a laboratory muffle furnace at 900° C. for 1 hour. This calcined clay had an oil absorption of 37 g. oil/100 g. clay and was milled in a Lancaster Mixer-Muller, Type PC, for 1 hour, after which treatment the oil absorption fell to 31 g./100 g. The sample was then micropulverized through a 0.020-inch screen. Particle size distribution of the calcined and milled product was the same as in Example 1.

EXAMPLE 5

From the coarse-grade, hydrous kaolin clay of Example 1, i.e. the "parent" clay having an average particle size of 4.1 microns, a coarser fraction of average particle size 6.4 microns was obtained by acid-washing the coarse-grade clay to remove any dispersant thereon, water washing and then re-dispersing the clay in water containing sodium hydroxide as the only dispersant. The clay was then fractionated by sedimentation techniques familiar to those in the art. The coarse fraction of the parent material was then dried and stored for use. The particle size distribution of the coarse fraction of the parent material was found by sedimentation techniques (Sedigraph) to be 100% finer than 40 microns, 90% finer than 15 microns, 70% finer than 9.2 microns, 50% finer than 6.4 microns, 30% finer than 4.6 microns, 10% finer than 3 microns and 5% finer than 2 microns.

For blending purposes a fine-grade hydrous kaolin clay having a particle size distribution of 100% finer than 5 microns, 90% finer than 2 microns, 70% finer than 0.55 microns, 50% finer than 0.27 microns, 30% finer than 0.16 microns and 10% finer than 0.10 microns was used. This clay was obtained from blunged, degritted, fractionated and bleached crude kaolin from Georgia. The fine-grade clay was acid flocced by acidifying the slurry to a pH of about 2.5–3.0 with a 10% sulfuric acid solution to remove dispersant. The suspension was then filtered and the solids washed with water, air dried at 50° C. overnight and micropulverized through an 0.020-inch screen prior to use.

The fine-grade clay of average particle size (e.s.d.) of 0.27 microns was dry-blended with the coarse fraction clay of average particle size (e.s.d.) of 6.4 microns in the ratio 1 part fine to 4 parts coarse by weight. The blend was calcined in a laboratory muffle furnace at 925° C. for 90 minutes then milled in a Lancaster Mixer-Muller for 1 hour and subsequently micropulverized using an 0.020 inch diameter round-hole screen. The particle size distribution of the resulting product was 100% finer than 44 microns, 90% finer than 13.5 microns, 70% finer than 7.3 microns, 50% finer than 4.8 microns, 30% finer than 2.8 microns, 20% finer than 0.9 microns and 10% finer than 0.45 microns. The oil absorption of the calcined and milled blend was 25 g. oil/100 g. clay by ASTM. By way of comparison, the oil absorption of the blend prior to calcined was 38 g. oil/100 g. clay by ASTM.

The chalking rating was evaluated by using 100% blended pigment in an acrylic latex formulation discussed in the example following:

EXAMPLE 6

Single pigment paints for chalking tests were formulated in a latex system at 30% PVC. The CPVC's of the pigments varied but were generally above 48%. The latex paint formulations ,ased on 100 gallons of paint follow:

| 30% PVC LATEX PAINT FORMULATION | | |
|---|---|---|
| | "Grind" | |
| Component | Weight(lbs.) | Volume(gal.) |
| Water | 25.0 | 3.0 |
| Natrosol ® 250HR cellulosic thickener in 2% solution | 120.0 | 14.38 |
| Igepal CO630 wetting agent | 3.0 | 0.34 |
| Tamol ® 731 dispersant in 25% solution | 2.0 | 0.26 |
| Pigment | 190–210 | 9.0 |
| Super Ad-it ® biocide | 1.0 | 0.12 |
| Colloid 581B defoamer | 1.5 | 0.22 |

Above ingredients were dispersed for 15 minutes at high speed on a Premier Mill Model 200 Dispersator with a 2½ inch Cowles blade. The speed was then reduced and the following ingredients were added and mixed 10–15 minutes (or until smooth appearance achieved) at reduced speed:

| | "Let-Down" | |
|---|---|---|
| Component | Weight(lbs.) | Volume(gal.) |
| Colloid 581B defoamer | 1.5 | 0.22 |
| UCAR ® 366 acrylic latex | 370.0 | 40.88 |
| Water and 2% Natrosol 250HR thickener | 286.4 | 32.16 |
| | | 100.0 |

The amount of Natrosol thickener added to the "Let-Down" portion of the mix was just sufficient to give 85 Ku (Krebs units) on the Stormer viscometer, an instrument for viscosity measurement widely used by those in the paint art. For the purposes of generating laboratory-size samples, the weight values given above were scaled down to give a sample size of approximately one pint.

TABLE I

CHALKING RATING (ASTM D659-74) OF VARIOUS PIGMENTS IN 30% PVC LATEX FORMULATION AFTER 1500 HOURS EXPOSURE IN UVCON

| Pigment | Rating |
|---|---|
| Pigment of Example 1 (coarse calcined kaolin) | 7 |
| Pigment of Example 2 (coarse calcined kaolin) | 9 |
| Pigment of Example 3 (coarse calcined kaolin) | 9 |
| Pigment of Example 4 (coarse calcined kaolin) | 9 |
| Pigment of Example 5 (calcined kaolin blend) | 9 |
| Chem Carb ® 44 pigment (coarse calcium carbonate) | 8 |
| ASP ® 400 clay (coarse hydrous kaolin) | 5 |

A rating of 10 indicates no chalking. Superior resistance to chalking is exhibited by the pigments of Examples 2–4, which had been calcinated to substantial dehydration, i.e. kaolin clay that had passed through the characteristic endotherm. Kaolin clay which had been partially dehydrated (Pigment of Example 1) showed improved chalking resistance over hydrous kaolin clay. Kaolin clay that had been substantially dehydrated showed the highest resistance to chalking of the samples tested, indeed virtually not chalking at all. Although no difference was found relevant to chalking resistance between kaolin clay pigment that had been calcined at 600° C. and that which had been calcined at 900° C., the 900° C. calcination temperature is preferred because it yields a higher brightness pigment. Indeed, calcining at temperatures below 800° C. will generally lead to pigments of unsatisfactory brightness.

EXAMPLE 7

In order to show that pigments of the present invention possess high opacifying power and good optical properties, several paint samples were formulated at 45% PVC and evaluated for optical properties. The formulation used is given below:

45% PVC LATEX PAINT FORMULATION

"Grind"

| Component | Weight(lbs.) | Volume(gal.) |
|---|---|---|
| Water | 26.0 | 3.12 |
| Natrosol HR250 cellulosic thickener in 2% solution | 120.0 | 14.38 |
| Igepal CO630 wetting agent | 3.0 | 0.34 |
| Tamol 731 dispersant in 25% solution | 5.0 | 0.66 |
| TiO$_2$ (R960) Primary Pigment | 225.0 | 6.76 |
| Extender pigment | 122–128 | 5.70 |
| Super Ad-it biocide | 1.0 | 0.12 |
| Colloid 581B defoamer | 1.5 | 0.22 |

Above ingredients were dispersed for 15 minutes at high speed on a Premier Mill Model 2001 Dispersator with a 2½ inch Cowles blade. The speed was then reduced and the following ingredients were added and mixed 10–15 minutes (or until smooth appearance achieved) at reduced speed:

"Let-Down"

| Component | Weight(lbs.) | Volume(gal.) |
|---|---|---|
| Colloid 581B defoamer | 1.5 | 0.22 |
| UCAR 366 acrylic latex | 266.4 | 29.6 |
| Water and 2% solution of Natrosol | 324.9 | 38.99 |
| | | 100.0 |

Extender pigments included calcined kaolin of the present invention, hydrous kaolin, and calcium carbonate. The amount of Natrosol thickener added to the "Let-Down" portion of the mix was just sufficient to give 85 Ku (Krebs units) on the Stormer Viscometer. For the purpose of generating laboratory-size samples, the weight of each ingredient was scaled down to give a sample size of approximately one pint.

Samples of paint were so prepared using various extender pigments to evaluate the optical properties. These are shown in Table II below:

TABLE II

OPTICAL PROPERTIES OF VARIOUS EXTENDER PIGMENTS IN FULL FORMULATION, 45% PVC LATEX PAINT

| Extender Pigment | Hiding Power ft.$^2$/gal.* | % Tinting Strength** | Percent 85° Sheen |
|---|---|---|---|
| Hydrous Kaolin (ASP 400 pigment) | 332 | 100 | 7.7 |
| Pigment of Example 4 (coarse calcined kaolin) | 339 | 100 | 6.7 |
| Pigment of Example 5 (calcined kaolin blend) | 326 | 100 | 5.7 |
| Chem Carb 44 Pigment (coarse calcium carbonate) | 269 | 93 | 6.7 |
| Gold Bond ® R Pigment | 298 | 97 | 2.9 |
| (coarse silica) | | | |

*at 0.98 contrast ratio, determined by Kubelka-Munk analysis.
**relative to ASP 400 hydrous kaolin.

These results show that the desirable optical properties of kaolin pigments are retained by the calcined kaolin pigments of the present invention.

What is claimed is:

1. A process for producing a calcined kaolin clay pigment which comprises:
   (a) fractionating a hydrous clay to obtain a fine fraction having an average particle size less than about 1 micron, e.s.d., and fractionating the same or a different hydrous clay to obtain a coarse fraction having an average particle size above about 3 microns, e.s.d.,
   (b) blending said fine fraction and said coarse fraction of clay such that the resulting blend has an average particle size in the range of about 3 to 10 microns, e.s.d.,
   (c) calcining said blended clay under conditions of time and temperature such that said hydrous kaolin clay is substantially dehydrated by passing through the characteristic kaolin endotherm, and
   (d) milling said calcined blended clay without reducing average particle size below about 3 microns, e.s.d. until an oil absorption below about 35 g. oil/100 g. clay as determined by ASTM spatula rubout is achieved.

2. A process of producing a calcined kaolin clay pigment which comprises:
   (a) blending coarse calcined kaolin clay particles having an average particle size above about 3 microns, e.s.d., and fine calcined kaolin clay particles having an average particle size smaller than about 1 micron, e.s.d., the resulting blend having an average particle size in the range of about 3 to 10 microns, e.s.d., and
   (b) milling said blended particles without reducing average particle size below about 3 microns, e.s.d. until an oil absorption below about 35 g. oil/100 g. clay as determined by ASTM spatula rubout is achieved.

3. The process of claim 1 or 2 wherein said calcined kaolin clay has been obtained by calcining hydrous kaolin clay under conditions of time and temperature such that said hydrous kaolin clay is substantially dehydrated by passing through the characteristic kaolin endotherm.

4. The process of claim 1 or 2 wherein said milling is carried out in a ring-roller or muller mill.

5. The process of claim 1 wherein said calcined clay is fluffed-up in a micropulverizer equipped with a screen after said milling.

6. The process of claim 2 wherein said calcined clay is fluffed-up in a micropulverizer equipped with a screen after said milling.

* * * * *